Patented June 28, 1927.

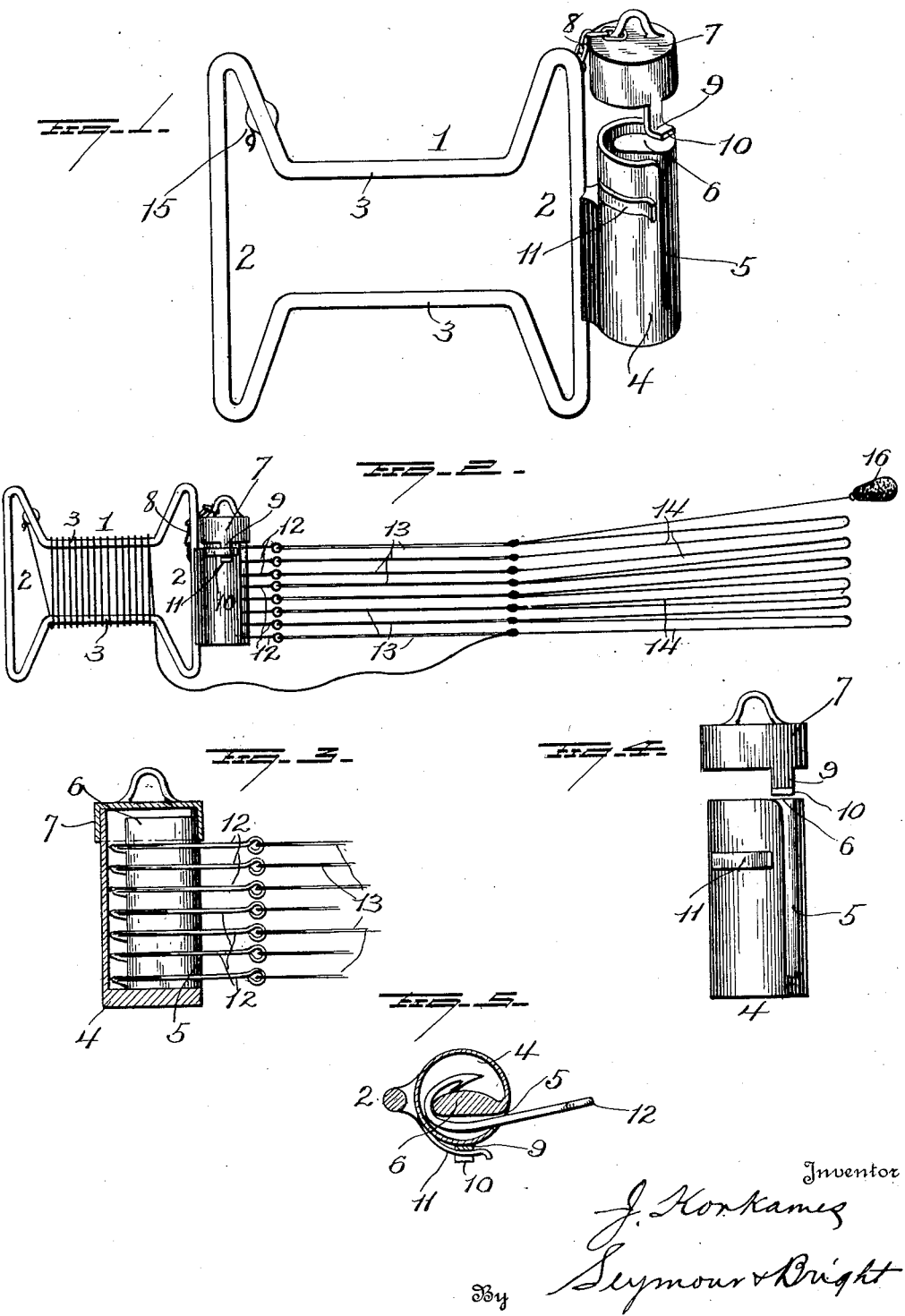

1,634,030

UNITED STATES PATENT OFFICE.

JOE KORKAMES, OF TEMPLE, TEXAS.

FISHING LINE.

Application filed September 22, 1926. Serial No. 137,057.

This invention has for its object the provision of a simple and inexpensive device whereby a fishing line may be disposed within a small compass when not in use and will be safe for handling at all times. Another object is to provide means for housing the hooks so that they will not be apt to become entangled with the line or with each other nor to catch in the clothing or person of the user, while the baiting of the hooks and the setting of the line may be rapidly and conveniently accomplished. The invention is illustrated in the accompanying drawing and will be hereinafter fully described, the novel features being particularly pointed out in the appended claims.

In the drawing, Figure 1 is a perspective view of the device embodying the invention;

Figure 2 is a plan view showing the line partly unwound, and extended preparatory to baiting the hooks;

Figure 3 is a longitudinal section through the hook receptacle or holder;

Figure 4 is a detail elevation of the hook receptacle;

Figure 5 is a transverse section of the hook receptacle.

The fishing-line holder includes a reel 1 which is preferably constructed of some non-corrodible metal and consists of end loops or heads 2 connected by parallel side bars 3, the side bars being preferably integral with the heads and defining a body appreciably narrower than the length of the heads, as shown clearly in Fig. 2. To one of the heads is secured a housing 4 which is substantially cylindrical with one closed and one open end and constructed with a longitudinal slot 5 which opens through the open end of the housing. This housing is preferably formed by rolling a sheet metal blank and it may be secured to the head in any approved manner, as by brazing, whereby a permanent joint will be attained. Within the housing is a core or hook-holding bar 6 which has a flat elliptical cross-sectional contour whereby it may fit within and be easily engaged by the fish hooks, the bar being so located within the housing that its exposed side will be flush with one wall of the slot 5, as shown in Fig. 5. A lid or cap 7 is provided to fit snugly over the open end of the housing and a chain or other flexible connection, 8 is provided to prevent loss of the cap, one end of the connection being secured to the cap and the other end thereof being secured to the reel. On the rim of the cap is a tongue 9 having a lug 10 at its end and so arranged that, if the cap be engaged on the open end of the cylinder and then rotated, the tongue will ride under a latch spring 11 on the cylinder with the lug 10 engaging behind the spring. Consequently, the cap cannot be released by a direct pull but must be first partly rotated, and, as the cap will preferably be of such diameter as to fit tightly upon the cylinder, accidental rotation is not apt to occur.

The fish hooks 12 are carried by snells 13 which are attached to the line 14 at spaced points in the usual manner. One end of the line is secured to the reel, as indicated at 15, and the opposite end of the line carries a sinker 16. When the line is not in use, the hooks are disposed within the housing 4 with their bills engaged around the core or holding bar 6 and their shanks passing through the slot 5 side by side, and the line is wrapped around the body of the reel with the snells and the portion of the line to which they are attached folded around the heads and secured by the sinker-carrying end portion of the line. When it is desired to fish, the end snell-carrying portion of the line is laid out as shown in Fig. 2. The first hook is then slipped sidewise through the open end of the housing (the cap having been removed), baited, and lowered toward the water or otherwise placed out of the way of contact with the person or clothing of the fisherman. The remaining hooks are likewise drawn one at a time from the housing, baited and disposed of, the line being then unwrapped from the reel to the extent desired. The procedure is reversed after fishing.

The device is very simple and its use avoids all tangling of the line, besides eliminating probable laceration of the hands or fingers or tearing of the clothes.

Having fully described my invention what I claim as new and desire to secure by Letters Patent, is:—

1. A fishing-line holder comprising a reel provided with a hook-receiving housing at one end, said housing being disposed in angular relation to the longitudinal axis of the reel, and means within the housing to maintain hooks received therein in radial relation to the housing and prevent withdrawal thereof through the side of the housing.

2. A fishing-line holder comprising a reel provided with a hook-receiving receptacle, a hook-holder extending longitudinally within the receptacle with its edge portion free of the receptacle to be engaged by and fit within hooks disposed within the receptacle, and a removable closure for the receptacle.

3. A fishing-line holder including a reel, a housing on the reel having a longitudinal hook-receiving slot in one side, a hook-holding core within the housing, and a removable closure for the housing.

4. A fishing-line holder including a reel, a cylindrical housing on the reel having a hook-accommodating slot in its side, means within the housing to prevent withdrawal of hooks through the slot, a latch on the housing, a cap engageable over the end of the housing, and locking tongue projecting from the cap and engageable under and behind the latch upon rotation of the cap.

5. A fishing line holder including a hook-receiving housing having a longitudinal slot in one side and having an open end, a hook-holding core disposed longitudinally in the housing with one side flush with a wall of the slot in the housing, said core having a substantially elliptical cross-sectional contour whereby it may fit within hooks disposed within the housing and projecting through the slot therein, and a closure for the open end of the housing normally preventing withdrawal of the hooks.

In testimony whereof, I have signed this specification.

JOE KORKAMES.